United States Patent
Sugiura

(10) Patent No.: US 6,280,244 B1
(45) Date of Patent: Aug. 28, 2001

(54) ELECTRIC CONNECTION BOX

(75) Inventor: Tomohiro Sugiura, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/521,008

(22) Filed: Mar. 7, 2000

(30) Foreign Application Priority Data

Mar. 8, 1999 (JP) .................................................. 11-060405

(51) Int. Cl.$^7$ .................................................. H01R 13/52
(52) U.S. Cl. ...................................... 439/521; 174/138 F
(58) Field of Search ..................................... 439/521, 201, 439/202, 204, 367, 465, 687, 318, 310, 533; 361/56, 823; 174/92, 138 F, 76, 87; 379/399, 451

(56) References Cited

U.S. PATENT DOCUMENTS

| | | | |
|---|---|---|---|
| 3,629,806 | * 12/1971 | Wietchmann | 174/92 |
| 4,729,059 | * 3/1988 | Wang | 439/521 |
| 4,749,363 | * 6/1988 | Luska et al. | 439/521 |
| 4,909,756 | * 3/1990 | Jervis | 439/521 |
| 4,988,309 | * 1/1991 | Garretson | 439/318 |
| 5,371,323 | * 12/1994 | Schneider et al. | 174/138 F |
| 5,671,273 | * 9/1997 | Lanquist | 379/399 |
| 5,709,567 | 1/1998 | Gladd et al. . | |
| 5,771,151 | 6/1998 | Hotea . | |

FOREIGN PATENT DOCUMENTS

| | | |
|---|---|---|
| 0 782 233 A | 7/1997 | (EP) . |
| 0 816 177 A | 1/1998 | (EP) . |
| 62-19021 | 2/1987 | (JP) .................. H02G/3/16 |

* cited by examiner

Primary Examiner—Brian Sircus
Assistant Examiner—J. F. Duverne
(74) Attorney, Agent, or Firm—Sughrue, Mion, Zinn, Macpeak & Seas, PLLC

(57) ABSTRACT

A tubular portion is formed on a ceiling surface of a lid which covers a body. The tubular portion is received in an upper recess portion in a manner to cover a plate-like terminal.

6 Claims, 3 Drawing Sheets

ELECTRIC CONNECTION BOX

BACKGROUND OF THE INVENTION

This invention relates to an electric connector box used in an automobile or the like.

Internal wiring in an automobile is connected to an electric connection box incorporating electronic parts such as relays.

For example, an electric connection box 20, shown in Fig. 3, includes a body 21, electronic parts 22, such as relays, mounted in the body 21, and a lid 23 attached to the body 21 to cover the electronic parts 22. An upper recess portion 24 is formed in an upper surface of the body 21, and a side recess portion 25 is formed in a side surface of the body 21, and the upper recess portion 24 is continuous with the side recess portion 25. A power supply terminal 27 is fixedly secured to the upper recess portion 24. The power supply terminal 27 has a plate-like shape, and is fixedly secured to the upper recess portion 24 by a fixing bolt 26A, passing perpendicularly through the upper recess portion 24, and a nut 26B threaded on the fixing bolt 26A at the upper side of the body 21.

In this electric connection box 20, the body 21 is covered with the lid 23 in such a manner that the side recess portion 25 in the body 21 is also covered with the lid 23.

In the electric connection box 20, the side recess portion 25 in the body 21 is continuous with the upper recess portion 24, and the upper recess portion 24 is continuous with the entire area of the upper surface of the body 21. Therefore, when water intrudes from the lower edge of the lid 23 toward the upper side, there is a possibility that the water intrudes to the entire area of the upper surface through the side recess portion 25 and the upper recess portion 24, and therefore it has been required to provide any countermeasures for this.

SUMMARY OF THE INVENTION

The present invention has been made in order to meet the above requirement, and an object of the invention is to provide an electric connection box in which although a body, covered by a lid, has an upper recess portion and a side recess portion which are continuous with each other, water is prevented from intruding to an upper surface of the body.

The above object has been achieved by an electric connection box including:

- a body having an upper surface, a side surface, an upper recess recessed from said upper surface and a side recess recessed from said upper recess and disposed in said side surface;
- a terminal provided in said upper recess and said side recess;
- a lid covering said upper surface and said side surface;
- a tubular portion provided to said lid, wherein said lid is received by said upper recess to cover said terminal.

The fastening member is not limited to a fixing bolt and a nut, but a pin or a rivet can be used.

The tubular portion only need to project from the reverse surface (facing the body) of the lid toward the bottom of the upper recess portion in the body, and a wall of the tubular portion may be defined by a side wall of the lid, or may be formed by a wall independent of the side wall of the lid.

In the electric connection box of this construction, the tubular portion is received in the upper recess portion in a manner to cover the plate-like terminal, and therefore even when water intrudes from the lower edge of the lid toward the upper side, the tubular portion serves as a waterproof wall, and therefore the water will hardly intrude to the upper recess portion in the body, and therefore the above object can be achieved.

In the invention, when the plate-like terminal is mounted in inclined relation to the upper recess portion, an end of the tubular portion can contact the plate-like terminal. Therefore, if the plate-like terminal is incompletely connected, the end of the tubular portion contacts the fastening member, so that the lid can not be properly attached to the body.

In this electric connection box, the incomplete connection of the plate-like terminal can be detected from the incomplete attachment of the lid to the body, and the attention of the operator is drawn to this fact, so that the rate of defective products can be greatly reduced.

DERAILED DESCRIPTION OF PREFERRED EMBODIMENTS

A preferred embodiment of the present invention will now be described in detail with reference to the drawings.

Figure 3:
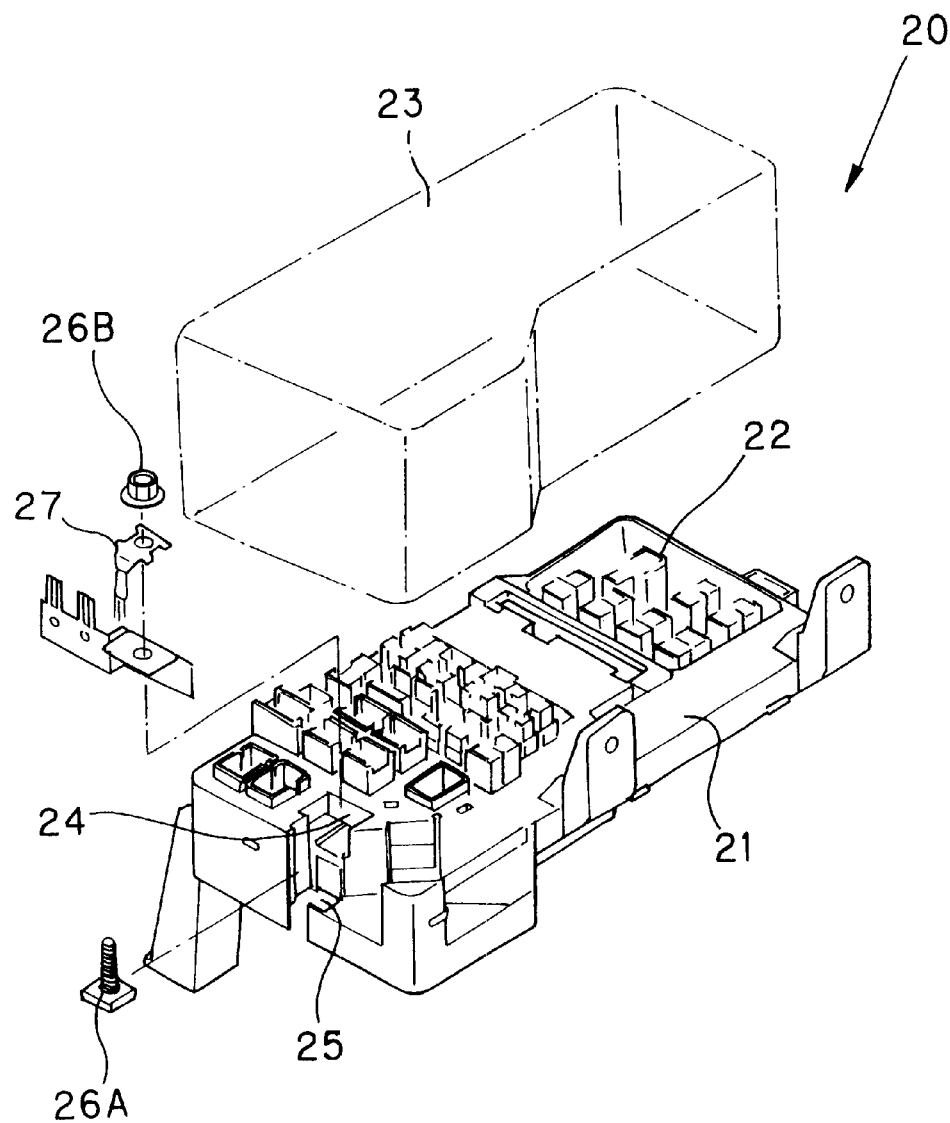
FIG. 3 is a perspective view of a conventional electric connection box.

In this embodiment, those members, already described with reference to FIG. 3, will be designated by corresponding reference numerals, and explanation thereof will be saved or omitted.

Figure 1A:
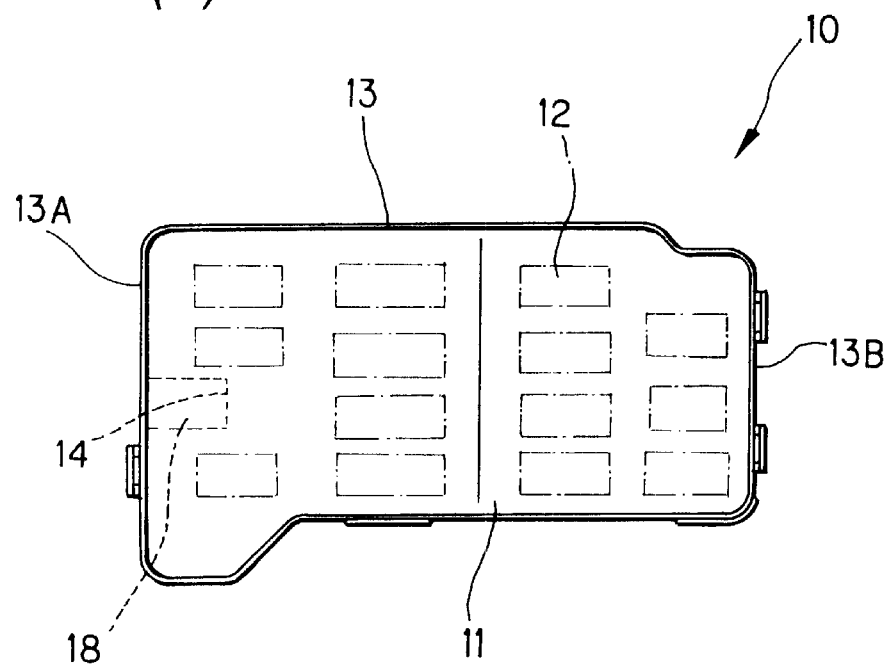
FIG. 1(A) and FIG. 1(B) are top plan view and side-elevational respectively, of a preferred embodiment of the invention.
Figure 1B:
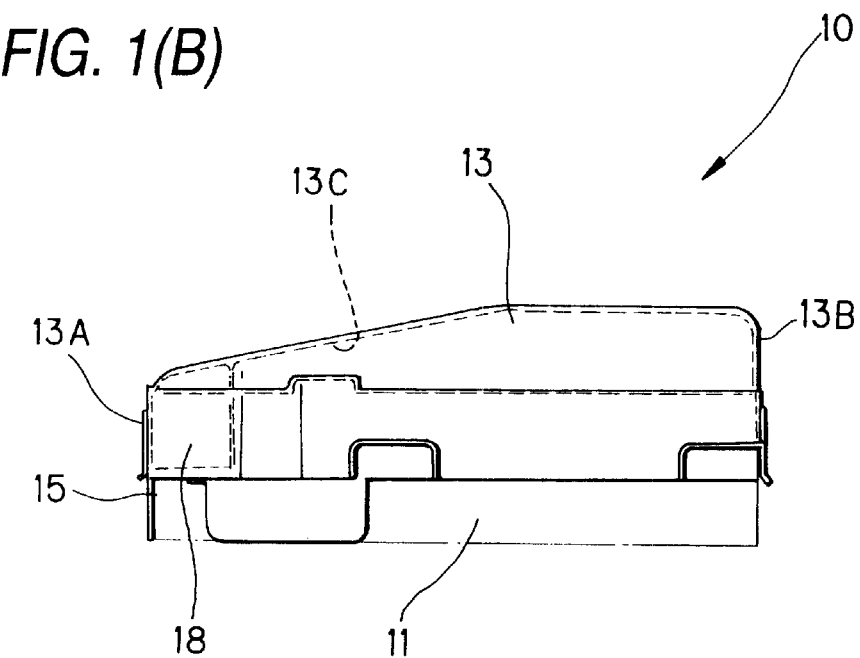

As shown in FIGS. 1A and 1B, an electric connection box 10 of this embodiment includes a body 11, incorporating electronic parts 12 such as relays, and a lid 13 which covers an upper surface and a side surface (peripheral surface) of the body 11.

The lid 13 is of a deep dish-shape, and has side surfaces 13A and 13B. The lid 13 has a square tubular portion 18 corresponding to an upper recess portion 14 in the body 11, and this tubular portion extends from a ceiling surface 13C toward the body 11.

Figure 2A:
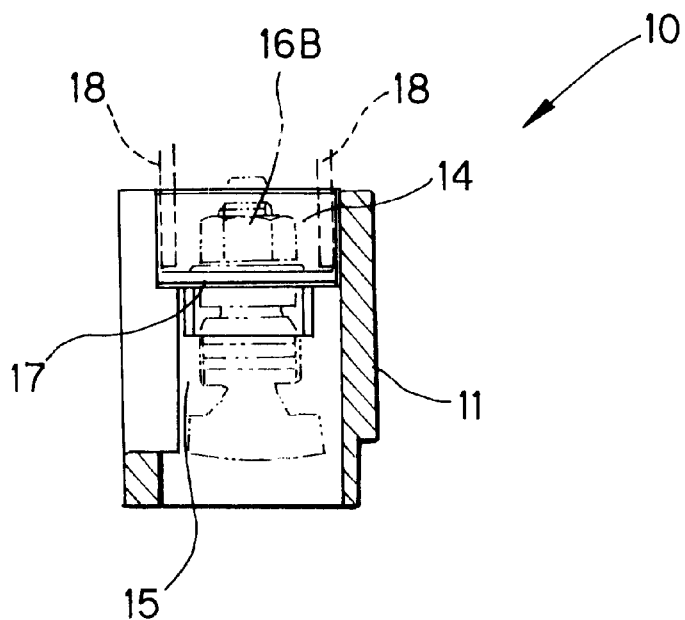
FIG. 2(A) and FIG. 2(B) are enlarged, cross-sectional views of an important portion of FIG. 1.
Figure 2B:
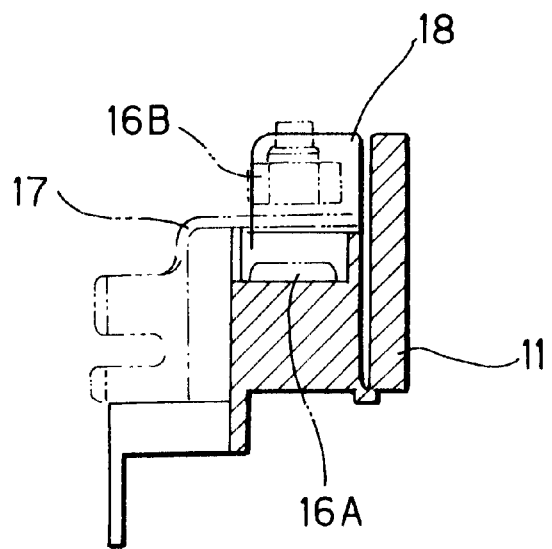

As shown in FIGS. 2A and 2B, a plate-like terminal 17 is fixedly secured by a fixing bolt 16A and a nut 16B to the upper recess portion 14 and a side recess portion 15 formed in the body 11.

When the body 11 is covered with the lid 13, the tubular portion 18 is received in the upper recess portion 14 in a manner to cover the plate-like terminal 17. The tubular portion 18 has such an axial length that when the plate-like terminal 17 is properly fixed, an end surface of the tubular portion 18 is disposed in close proximity to the plate-like terminal 17.

Namely, if the plate-like terminal 17 is fixed in inclined relation to the upper recess portion 14 and the fixing bolt 16A, the end surface of the tubular portion 18 contacts the plate-like terminal 17, thereby preventing the lid 13 from being attached to the body 11.

In this electric connection box 10, the tubular portion 18, formed on the ceiling surface 13C of the lid 13, is received in the upper recess portion 14 in a manner to cover the plate-like terminal 17, and therefore even when water intrudes from the lower edge of the lid 13 toward the upper side, the tubular portion 18 serves as a waterproof wall, and therefore the water will not intrude into the upper recess portion in the body 11.

In this electric connection box, if the plate-like terminal 17 is fixed in inclined relation to the upper recess portion 14 and the fixing bolt 16A, the end surface of the tubular portion 18 contacts the plate-like terminal 17, thereby preventing the lid 13 from being attached to the body 11. Therefore, the incomplete connection of the plate-like terminal 17 can be detected from the incomplete attachment of the lid 13 to the body 11, and the attention of the operator is drawn to this fact, so that the rate of defective products can be greatly reduced.

The electric connection box of the invention is not limited to the above embodiment, and for example the material, shape, dimensions, number and arrangement of the body, the upper recess portion, the side recess portion, the fastening members, the plate-like terminal, the lid and the tubular portion in the above embodiment are arbitrary, and are not limited in so far as the present invention can be achieved.

The electric connection box of the invention is not limited to the connection box, containing the electric parts (e.g. relays) for connecting a wire harness in an automobile, but the invention can be applied to an electric connection box used in other equipments.

As described above, in the present invention, the tubular portion prevents water from intruding to the upper surface of the body.

In the invention, the incomplete connection of the plate-like terminal can be detected from the incomplete attachment of the lid to the body, and therefore the rate of defective products can be greatly reduced.

What is claimed is:

1. An electric connection box comprising:
   a body having an upper recess portion formed in an upper surface and a side recess portion formed in a side surface, said upper recess portion being continuous with said side recess portion;
   a terminal provided in said upper recess portion and said side recess portion;
   a lid covering said upper surface and said side surface; and
   a tubular portion extended from a ceiling surface of said lid toward said body, wherein when said lid covers said body, said tubular portion being received in said upper recess portion so as to cover said terminal.

2. The electric connection box according to claim 1, wherein an open end of said tubular portion is located below said upper surface when said lid covers said upper surface and said side surface.

3. The electric connection box according to claim 2, wherein when said terminal is improperly mounted relative to said upper recess portion, said open end contacts said terminal to prevent said lid for being mounted on said body.

4. The electric connection box according to claim 1, wherein said terminal is fixed to said upper recess portion by a fastening member.

5. The electric connection box according to claim 1, wherein a wall of said tubular portion is partially defined by a side wall of said lid.

6. The electric connection box according to claim 1, wherein a wall of said tubular portion is formed by a wall independent of a side wall of the lid.

\* \* \* \* \*